(12) United States Patent
Lee et al.

(10) Patent No.: US 8,880,086 B2
(45) Date of Patent: Nov. 4, 2014

(54) METHOD AND APPARATUS OF TRANSMITTING A WHITE SPACE MAP INFORMATION IN A WIRELESS LOCAL AREA NETWORK SYSTEM

(75) Inventors: Jihyun Lee, Anyang-si (KR); Eunsun Kim, Anyang-si (KR); Yongho Seok, Anyang-si (KR)

(73) Assignee: LG Electronics Inc., Seoul (KR)

( * ) Notice: Subject to any disclaimer, the term of this patent is extended or adjusted under 35 U.S.C. 154(b) by 241 days.

(21) Appl. No.: 13/395,573

(22) PCT Filed: Feb. 9, 2011

(86) PCT No.: PCT/KR2011/000841
§ 371 (c)(1),
(2), (4) Date: Mar. 12, 2012

(87) PCT Pub. No.: WO2011/122763
PCT Pub. Date: Oct. 6, 2011

(65) Prior Publication Data
US 2012/0184318 A1 Jul. 19, 2012

Related U.S. Application Data

(60) Provisional application No. 61/318,383, filed on Mar. 28, 2010, provisional application No. 61/386,991, filed on Sep. 27, 2010.

(51) Int. Cl.
*H04W 72/00* (2009.01)
*H04W 48/16* (2009.01)
*H04W 16/14* (2009.01)
*H04W 84/12* (2009.01)

(52) U.S. Cl.
CPC .............. *H04W 48/16* (2013.01); *H04W 16/14* (2013.01); *H04W 84/12* (2013.01)
USPC .................. 455/452.1; 455/456.1; 455/456.3; 455/67.11

(58) Field of Classification Search
CPC .......................... H04W 72/0493; H04W 4/023
USPC ........ 455/456.3, 456.1, 515, 434, 509, 452.1, 455/67.13, 454, 451, 67.11
See application file for complete search history.

(56) References Cited

U.S. PATENT DOCUMENTS

| 6,850,497 B1* | 2/2005 | Sigler et al. ................... 370/310 |
| 2006/0153133 A1 | 7/2006 | Zhong |

(Continued)

FOREIGN PATENT DOCUMENTS

| CN | 1723656 A | 1/2006 |
| CN | 101142788 A | 3/2008 |

(Continued)

OTHER PUBLICATIONS

International Search Report from International Application No. PCT/KR2011/000841 mailed Oct. 19, 2011.

(Continued)

*Primary Examiner* — John J Lee
(74) *Attorney, Agent, or Firm* — Morgan, Lewis & Bockius LLP

(57) ABSTRACT

A method of transmitting a White Space Map information in a wireless local area network system (WLAN) is disclosed. A method of transmitting a white space map information from a first station to a second station in a regulatory domain where a licensed device and an unlicensed device are permitted to operate together in a wireless local area network (WLAN) comprises acquiring a first list of available channels at each location of a plurality of locations from a regulatory database; determining a second list of available channels at a white space zone (WSZ) using the first list of available channels at each location of a plurality of locations; and transmitting, to the second station, one of a beacon frame, a probe response frame and a white space map announcement frame comprising a white space map (WSM) element, the WSM element including information of the WSZ and the second list of available channels, wherein the WSZ is a geographical area in which common available channels are set.

10 Claims, 9 Drawing Sheets

(56) References Cited

U.S. PATENT DOCUMENTS

| | | |
|---|---|---|
| 2008/0233946 A1 | 9/2008 | Henry |
| 2008/0280621 A1 | 11/2008 | Soomro et al. |
| 2009/0116430 A1 | 5/2009 | Bonta et al. |
| 2010/0048234 A1* | 2/2010 | Singh .......................... 455/509 |
| 2010/0080163 A1* | 4/2010 | Krishnamoorthi et al. ... 370/312 |
| 2011/0116458 A1 | 5/2011 | Hsu et al. |

FOREIGN PATENT DOCUMENTS

| | | |
|---|---|---|
| JP | 2007-088940 A | 4/2007 |
| JP | 2007-184850 A | 7/2007 |
| JP | 2013-511235 A | 3/2013 |

OTHER PUBLICATIONS

Office Action dated Jan. 16, 2014, issued by the State Intellectual Property Office of China in Chinese Patent Application No. 201180004444.7.

IEEE Standard for Information technology—Telecommunications and information exhcange between systems—Local and metropolitan area networks—Specific requirements, "Part 11: Wireless LAN Medium Access Control (MAC) and Physical Layer (PHV) Specifications," Amendment 3: 3650-3700 MHz Operation in USA, IEEE Computer Society, Nov. 6, 2008.

* cited by examiner

Fig. 8

| Device Type | Channel Number N | Max. Transmission Power level on Channel N | ...... | Channel Number K | Max. Transmission Power level on Channel K | Registered Location | White Space Zone Range |
|---|---|---|---|---|---|---|---|
| Octet | 1 | 1 | | 1 | 1 | variable | variable |

Fig. 9

| B0 | | B5 B6 | | | | B30 |
|---|---|---|---|---|---|---|
| Latitude Resolution | | | Latitude Fraction | | | |
| Bits | | 6 | | 25 | | |

| B31 | | | B39 B40 | | B45 |
|---|---|---|---|---|---|
| Latitude Integer | | | Longitude Resolution | | |
| Bits | 6 | | | 6 | |

| B46 | | B39 B40 | | B70 B71 | | B79 |
|---|---|---|---|---|---|---|
| Longitude Fraction | | | | Longitude Integer | | |
| Bits | | 25 | | | 9 | |

| B80 | B83 B84 | | | B89 B90 | | B97 |
|---|---|---|---|---|---|---|
| Altitude Type | Altitude Resolution | | | Altitude Fraction | | |
| Bits | 4 | 6 | | | 8 | |

| B98 | | B119 B120 | B122 |
|---|---|---|---|
| Altitude Interger | | Altitude Fraction | |
| Bits | 22 | 3 | |

| B123 | B124 | B125 | B126 | B127 |
|---|---|---|---|---|
| RegLoc Agreement | Regloc DSE | Dependent STA | Reserved | |
| Bits  1 | 1 | 1 | 2 | |

| B128 | | B143 |
|---|---|---|
| Dependent Erablement Identifier | | |
| Bits | 16 | |

| B144 | | B151 B152 | | B159 |
|---|---|---|---|---|
| Regulatory Class | | Channel Number | | |
| Bits | 8 | | 8 | |

METHOD AND APPARATUS OF TRANSMITTING A WHITE SPACE MAP INFORMATION IN A WIRELESS LOCAL AREA NETWORK SYSTEM

This is a U.S. National Phase Entry of PCT Application No. PCT/KR2011/000841, filed Feb. 9, 2011, which claims the benefit of US Provisional Application Nos. 61/318,383 filed Mar. 28, 2010 and 61/386,991 filed Sep. 27, 2010.

TECHNICAL FIELD

The present invention relates to a wireless local area network (WLAN), and more particularly, to a method of transmitting a White Space Map information in a wireless local area network system (WLAN).

BACKGROUND ART

The standard for a Wireless Local Area Network (WLAN) technology is established by IEEE 802.11 standard association. IEEE 802.11a/b among IEEE 802.11 standards provides 11 Mbps (IEEE 802.11b) or 54 Mbps (IEEE 802.11a) transmission efficiency using unlicensed band on 2.4. GHz or 5 GHz frequency band. IEEE 802.11g, adapting OFDM (Orthogonal Frequency Divisional Multiplexing) technology, provides 54 Mbps transmission efficiency. And, IEEE 802.11n, adapting MIMO-OFDM technology, provides 300 Mbps transmission efficiency for 4 spatial streams. IEEE 802.11n provides 40 MHz channel bandwidth, and in this case it provides up to 600 Mbps transmission efficiency.

Now, a standard for regulating the WLAN operation in TV White Space is under establishment, as IEEE 802.11af.

TV Whitespace includes channels allocated to broadcast TV, which are permitted to be used by cognitive radio device. TV White Space may include UHF band and VHF band. The spectrum not used by a licensed device (hereinafter, can be called as 'White Space') can be used by an unlicensed device. The frequency band permitted to be used by unlicensed device can be differently defined for each country. Generally, this frequency band comprises 54-698 MHz (US, Korea), and some of this frequency band can't be used for the unlicensed device. Here, 'licensed device' means a device of the user permitted in this frequency band, and can be differently called as 'primary user', or 'incumbent user'. Hereinafter, the term of 'incumbent user' can be collectively used for these terms.

512-608 MHz and 614-698 MHz are permitted to be used by all kinds of unlicensed devices except a few of special cases. However, 54-60 MHz, 76-88 MHz, 174-216 MHz and 470-512 MHz are permitted to be used by fixed devices, which perform transmission at a fixed location.

The unlicensed device, which wishes to use the TV White Space (TVWS), shall acquire information for available channel list at its location. Hereinafter, the unlicensed device operating in the TVWS using MAC (Medium Access Control) and PHY (Physical) operation according to IEEE 802.11 can be called as TVWS terminal.

Unlicensed device should provide a protection mechanism for the incumbent user. That is, the unlicensed device should stop using a specific channel, when an incumbent user, such as wireless microphone, is using that specific channel.

For this purpose, an unlicensed device shall access geo-location database through internet or dedicated network and acquire an available channel list at its location. The geo-location database stores and manages the information of registered licensed devices, location of the registered licensed devices and channel usage information, which is changed dynamically.

Or, an unlicensed device shall perform spectrum sensing. Spectrum sensing mechanism comprises Energy Detection scheme, Feature Detection scheme, etc. By using this mechanism, unlicensed device determines that the channel is used by an incumbent user, when the strength of the primary signal is greater than a predetermined level, or when DTV (Digital Television) Preamble is detected. And, the unlicensed device (station or Access Point) shall lower its transmission power, when it is detected that the neighboring channel, next to the channel used by the unlicensed device, is used by the incumbent user.

According to the related art, an unlicensed device must acquire a new available channel list whenever it moves more than a predetermined distance. Therefore, there is a problem that overhead for acquiring an available channel list is generated.

DISCLOSURE OF INVENTION

Technical Problem

The object of the present invention is providing a method of transmitting an available channel list, which can reduce the overhead for acquiring an available channel list.

The object of the present invention is not limited the above stated objects, but includes various objects recited or apparent among the detailed description of the present invention.

Solution to Problem

One aspect of the present invention provides a method of transmitting a white space map information from a first station to a second station in a regulatory domain where a licensed device and an unlicensed device are permitted to operate together in a wireless local area network (WLAN) comprising acquiring a first list of available channels at each location of a plurality of locations from a regulatory database; determining a second list of available channels at a white space zone (WSZ) using the first list of available channels at each location of a plurality of locations; and transmitting, to the second station, one of a beacon frame, a probe response frame and a white space map announcement frame comprising a white space map (WSM) element, the WSM element including information of the WSZ and the second list of available channels, wherein the WSZ is a geographical area in which common available channels are set.

Preferably, the WSZ may be determined by the first station or the second station.

Preferably, the available channels at the WSZ may be common channels of the available channels at the each location of the plurality of locations.

Preferably, the WSM element may include a registered location field indicating information of location of a specific point in the WSZ and a white space zone range field indicating range of the WSZ, wherein the registered location field and the white space zone range field together specify the WSZ.

Preferably, the registered location field may be set to geo-location information expressed as 3 dimensional coordinate.

Another aspect of the present invention provides an apparatus of transmitting a white space map information from a first station to a second station in a regulatory domain where a licensed device and an unlicensed device are permitted to operate together in a wireless local area network (WLAN) comprising a processor configured to acquire a first list of available channels at each location of a plurality of locations from a regulatory database, and determine a second list of available channels at a white space zone (WSZ) using the first list of available channels at each location of a plurality of locations; and a transceiver configured to transmit, to the second station, one of a beacon frame, a probe response frame and a white space map announcement frame comprising a white space map (WSM) element, the WSM element including information of the WSZ and the second list of available channels, wherein the WSZ is a geographical area in which common available channels are set.

Another aspect of the present invention provides a method of transmitting a white space map information from a first station to a second station in a regulatory domain where a licensed device and an unlicensed device are permitted to operate together in a wireless local area network (WLAN) comprising: receiving a white space map (WSM) request frame from the second station, the WSM request frame including information of a white space zone (WSZ); acquiring a first list of available channels at each location of a plurality of locations in the WSZ from a regulatory database; determining a second list of available channels at the WSZ using the first list of available channels; and transmitting, to the second station, a WSM Response frame comprising including the second list of available channels at the WSZ, wherein the WSZ is a geographical area in which common available channels are set.

Preferably, the WSZ is determined by the second station.

Preferably, the available channels at the WSZ are common channels of the available channels at the each location of the plurality of locations.

Advantageous Effects of Invention

According to embodiments of the present invention, the overhead for acquiring an available channel list can be reduced since the dependent STA can operate on available channels at WSZ while moving in WSZ.

It will be appreciated by persons skilled in the art that the effects that could be achieved with the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention, illustrate embodiments of the invention and together with the description serve to explain the principle of the invention.

In the drawings:

FIG. 8 shows an exemplary format of the Channel Map field according to an embodiment of the present invention.

FIG. 9 shows exemplary format of the Registered Location field.

BEST MODE FOR CARRYING OUT THE INVENTION

Reference will now be made in detail to the embodiments of the present invention, examples of which are illustrated in the accompanying drawings. Wherever possible, the same reference numbers will be used throughout the drawings to refer to the same or like parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

For the convenience of description and better understanding of the present invention, general structures and devices well known in the art will be omitted or be denoted by a block diagram or a flow chart.

First of all, Wireless Local Area Network (WLAN) system in which embodiments of the present invention can be applied is explained.

Figure 1:
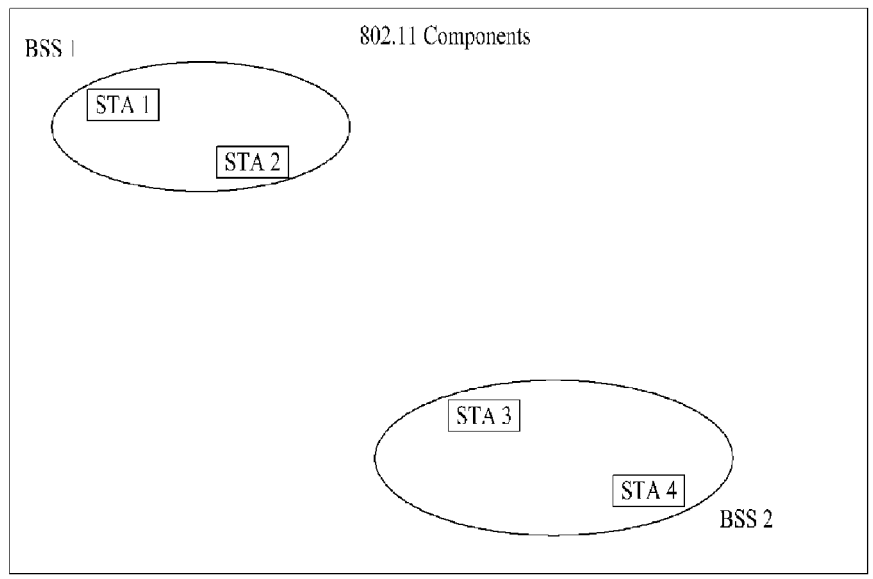
FIG. 1 shows an exemplary architecture of IEEE 802.11 system.

FIG. 1 shows an exemplary architecture of IEEE 802.11 system.

The IEEE 802.11 architecture consists of several components that interact to provide a WLAN that supports STA (station) mobility transparently to upper layers. The basic service set (BSS) is the basic building block of an IEEE 802.11 LAN. FIG. 1 shows two BSSs, each of which has two STAs that are members of the BSS. It is useful to think of the ovals used to depict a BSS as the coverage area within which the member STAs of the BSS may remain in communication. (The concept of area, while not precise, is often good enough.) This area is called the Basic Service Area (BSA). If a STA moves out of its BSA, it can no longer directly communicate with other STAs present in the BSA.

The independent BSS (IBSS) is the most basic type of IEEE 802.11 LAN. A minimum IEEE 802.11 LAN may consist of only two STAs. Since the BSSs shown in FIG. 1 are simple and lack other components (contrast this with FIG. 2), the two can be taken to be representative of two IBSSs. This mode of operation is possible when IEEE 802.11 STAs are able to communicate directly. Because this type of IEEE 802.11 LAN is often formed without pre-planning, for only as long as the LAN is needed, this type of operation is often referred to as an ad hoc network.

A STA's membership in a BSS is dynamic (STAs turn on, turn off, come within range, and go out of range). To become a member of a BSS, a STA joins the BSS using the synchronization procedure. To access all the services of an infrastructure BSS, a STA shall become "associated." These associations are dynamic and involve the use of the distribution system service (DSS).

Figure 2:
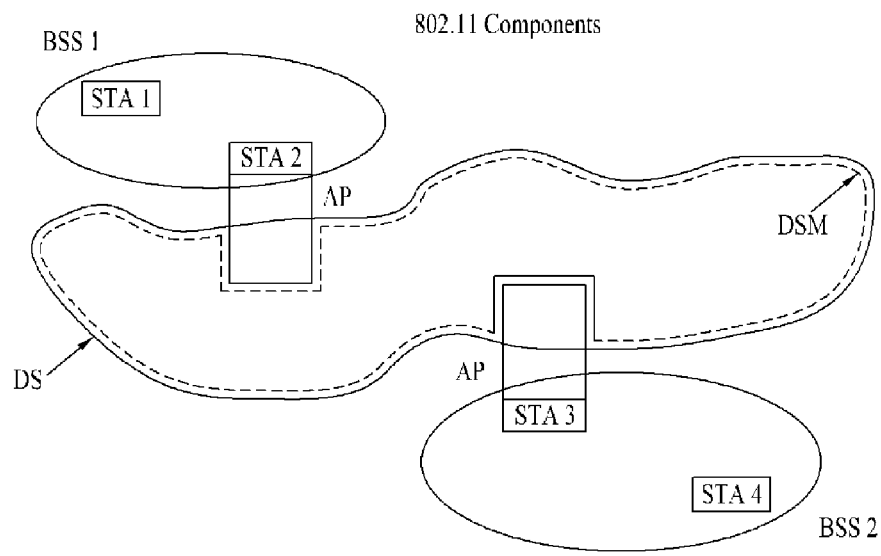
FIG. 2 is another exemplary architecture of IEEE 802.11 system in which the DS, DSM and AP components are added to the IEEE 802.11 architecture picture.

FIG. 2 is another exemplary architecture of IEEE 802.11 system in which the DS, DSM and AP components are added to the IEEE 802.11 architecture picture.

PHY limitations determine the direct station-to-station distance that may be supported. For some networks, this distance is sufficient; for other networks, increased coverage is required. Instead of existing independently, a BSS may also form a component of an extended form of network that is built with multiple BSSs. The architectural component used to interconnect BSSs is the DS (Distribution System).

IEEE Std 802.11 logically separates the WM (wireless Medium) from the distribution system medium (DSM). Each logical medium is used for different purposes, by a different component of the architecture. The IEEE 802.11 definitions neither preclude, nor demand, that the multiple media be either the same or different.

Recognizing that the multiple media are logically different is the key to understanding the flexibility of the architecture. The IEEE 802.11 LAN architecture is specified independently of the physical characteristics of any specific implementation.

The DS enables mobile device support by providing the logical services necessary to handle address to destination mapping and seamless integration of multiple BSSs.

An access point (AP) is any entity that has STA functionality and enables access to the DS, via the WM for associated STAs.

Data move between a BSS and the DS via an AP. Note that all APs are also STAs;

thus they are addressable entities. The addresses used by an AP for communication on the WM and on the DSM are not necessarily the same.

Data sent to the AP's STA address by one of the STAs associated with it are always received at the uncontrolled port for processing by the IEEE 802.1x port access entity. In addition, if the controlled port is authorized, these frames conceptually transit the DS.

Hereinafter, Extended Service Set (ESS) for a large coverage network is explained.

Figure 3:
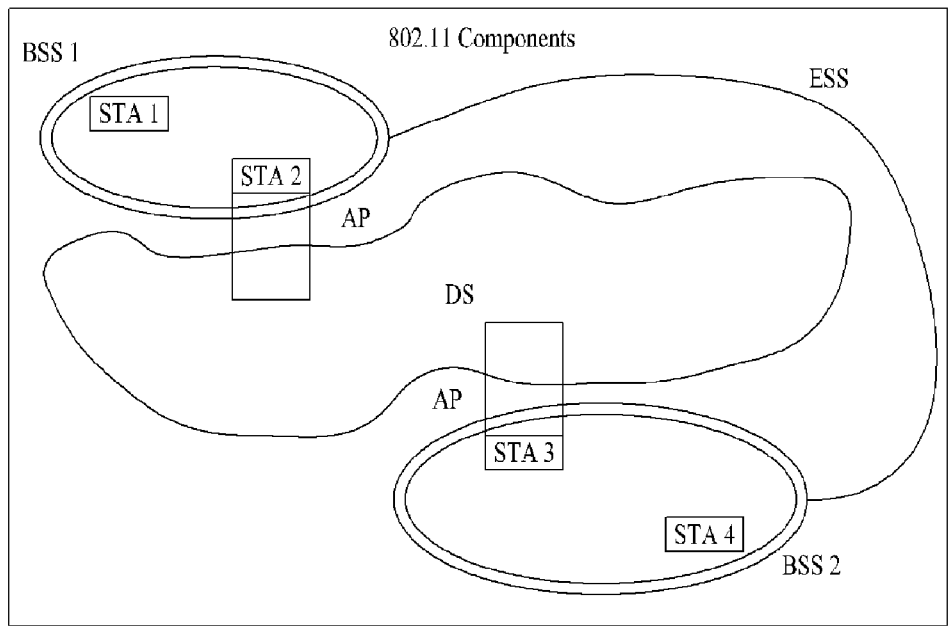
FIG. 3 shows another exemplary architecture of IEEE 802.11 system for explaining the concept of ESS.

FIG. 3 shows another exemplary architecture of IEEE 802.11 system for explaining the concept of ESS.

The DS and BSSs allow IEEE Std 802.11 to create a wireless network of arbitrary size and complexity. IEEE Std 802.11 refers to this type of network as the ESS network. An ESS is the union of the BSSs connected by a DS. The ESS does not include the DS. The key concept is that the ESS network appears the same to an LLC (logical link control) layer as an IBSS network. STAs within an ESS may communicate and mobile STAs may move from one BSS to another (within the same ESS) transparently to LLC.

Nothing is assumed by IEEE Std 802.11 about the relative physical locations of the BSSs in FIG. 3. All of the following are possible:

The BSSs may partially overlap. This is commonly used to arrange contiguous coverage within a physical volume.

The BSSs could be physically disjoint. Logically there is no limit to the distance between BSSs.

The BSSs may be physically collocated. This may be done to provide redundancy.

One (or more) IBSS or ESS networks may be physically present in the same space as one (or more) ESS networks. This may arise for a number of reasons. Some examples are when an ad hoc network is operating in a location that also has an ESS network, when physically overlapping IEEE 802.11 networks have been set up by different organizations, and when two or more different access and security policies are needed in the same location.

Figure 4:
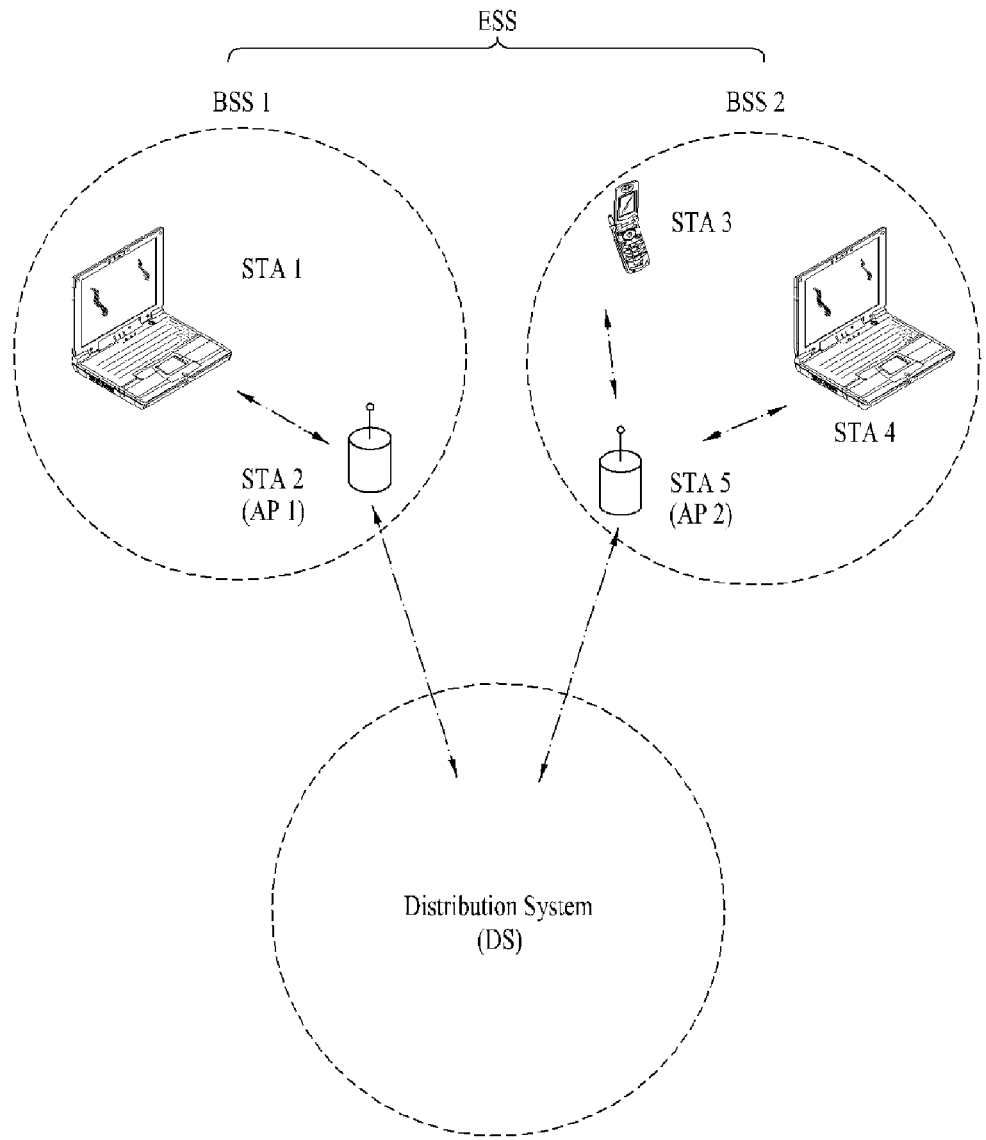
FIG. 4 shows exemplary system architecture for better understanding the WLAN system.

FIG. 4 shows exemplary system architecture for better understanding the WLAN system.

As can be understood, FIG. 4 is an example of infrastructure BSS including DS. And BSS 1 and BSS 2 consist of ESS. In WLAN system, a STA is a device operating according to MAC/PHY regulation of IEEE 802.11, and includes an AP STA and non-AP STA, such a laptop computer, mobile phone, etc. Usually, the device which a user directly handles is non-AP STA. Hereinafter, non-AP STA can be differently called as (terminal), WTRU (Wireless Transmit/Receive Unit), User Equipment (UE), Mobile Station (MS), Mobile Terminal, Mobile Subscriber Unit, etc. And, non-AP STA, which can operate within TVWS spectrum, can be called as 'Non-AP WS STA' or 'WS STA'. AP can corresponds to Base Station (BS), Node-B, BTS (Base Transceiver System), or Femto BS in another field of wireless communication. AP, which can operate within TVWS, can be called as WS AP.

Hereinafter, a method of transmitting a White Space Map (WSP) information according to an embodiment of the present are disclosed.

First, necessity of WSM will be explained.

In order to operate in TVWS as an unlicensed device, a STA should find the network to be connected. This type of process may be called as 'scanning'. In IEEE 802.11, there are two types of scanning process. One is a passive scanning process, and the other is an active scanning process.

In the passive scanning scheme, the scanning STA receives a beacon frame transmitted periodically from AP while moving each channel on a channel list, and acquires information about a AP operating in the corresponding channel. The channel list specifies a list of channels that are examined when scanning for a BSS.

In the active scanning scheme, the scanning STA broadcasts a probe request frame while moving each channel on the channel list, and waits for a pertinent response. A AP, which received the probe request frame, transmits a probe response frame to the scanning STA. The probe response frame includes operation parameters (e.g., AP's capability information element, HT operation element, EDCA parameter set element, etc) for a BSS.

Delay and power consumption in active scan are lower than those in passive scan.

If we assume that the channel bandwidth used for by the IEEE 802.11 TVWS protocol in TVWS is the same as the channel bandwidth used by Digital TV (DTV), the channel bandwidth of each channel shall be 6 MHz. For IEEE 802.11 operation in 2.4 GHz and 5 GHz, the channel bandwidth is 20 MHz. This means that there are a lot more channels to be scanned by a STA in TVWS than the channels in 2.4 GHz and/or 5 GHz. This can significantly increase the scanning time and power consumption for a STA to find the network to be connected.

Also, in order to operate in TVWS as an unlicensed device, a STA should have a mechanism for protecting the incumbent user. The most casual approach to find the available channel in TVWS is performing, at the STA, 'sensing' to find whether there is an incumbent user operates on a specific channel. (It should be noted that the term 'sensing' is for finding whether there is a primary signal on a specific channel, that is, for finding the available channel, while the term 'scanning' is for finding the network to be connected.) Another approach is accessing the external regulatory domain database (DB) to find the available channel list in TVWS. For the TVWS, the external regulatory DB can be TV band database. The DB can include information for scheduling of licensed users at a specific geographic location.

If all the unlicensed devices access the regulatory database to acquire information for the available channels, it may be inefficient, and produce large signaling overhead. Thus, embodiments of the present invention propose to classify the unlicensed devices (STAs) into an enabling STA, and a dependent STA. Enabling STA in TVWS is defined as a registered location server (RLS) or a STA determining the available TV channels at its location using its own geographic location identification and TV bands database access capabilities. Dependent STA in TVWS is defined as a STA receiving available TV channel list from the enabling STA or the dependent AP of that enabling STA that enables its operation. Thus, according to the embodiment, enabling STA takes the role to permit the dependent STA to operate within TVWS within the available channels (the role to enable the dependent STA). This enabling procedure can be called as dynamic station enablement (DSE) procedure.

Therefore, the enabling STA can access via internet to the regulatory domain database and acquire the available channel list at its own geographic location, and deliver this available channel lists to other STAs, rather than each of the STAs perform sensing every channels to find whether they are available or not. In this document, information for the available channel list from the regulatory domain database may be called as 'White Space Map (WSM)'. Further, if a STA acquires the available channel list in TVWS to operate, the STA need not perform scanning on a channel identified as not available by WSM. Therefore, acquiring the WSM from DB and delivering this WSM can efficiently reduce the scanning time and power consumption.

Next, a method of transmitting WSM information according to first embodiment of the present invention is explained referring to draws.

Figure 5:
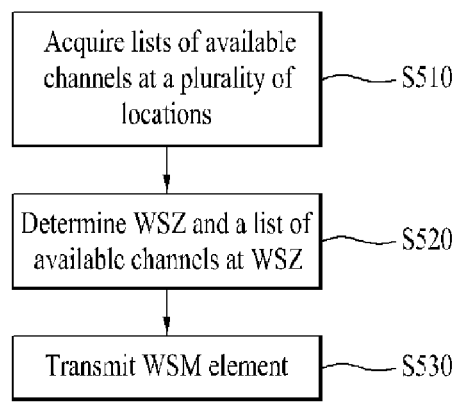
FIG. 5 shows a flow chart of a method of transmitting WSM information according to first embodiment of the present invention.

FIG. 5 shows a flow chart of first embodiment for a method of transmitting WSM information according to first embodiment of the present invention.

As shown in FIG. 5, an enabling STA acquires a list of available channels at each location of a plurality of locations from a regulatory database [S510]. An enabling STA can acquire not only a list of available channels at its location but also a list of available channels at each location of a plurality of locations.

The enabling STA determines a white space zone (WSZ) and a list of available channels at the WSZ using the list of available channels at each location of the plurality of locations [S520]. The enabling STA can determine a geographical area, in which common available channels can be set, with the list of available channels at each location. The geographical area has boundary defined with coordinate set. A STA can move in the boundary without updating a list of available channels, since available channels are same in the boundary. If a STA move out of the boundary, it should acquire a new list of available channels. In this document, the geographical area may be called as "white space zone (WSZ)". Or, a dependent STA can determine a WSZ and request available channels at the WSZ to the enabling STA. The enabling STA also can determine a list of available channels at the WSZ using the list of available channels at each location. A scheme of determining a list of available channels at the WSZ can be various. For example, common channels of available channels at each location of the plurality of locations can be available channels at the WSZ.

Figures 6, 7:
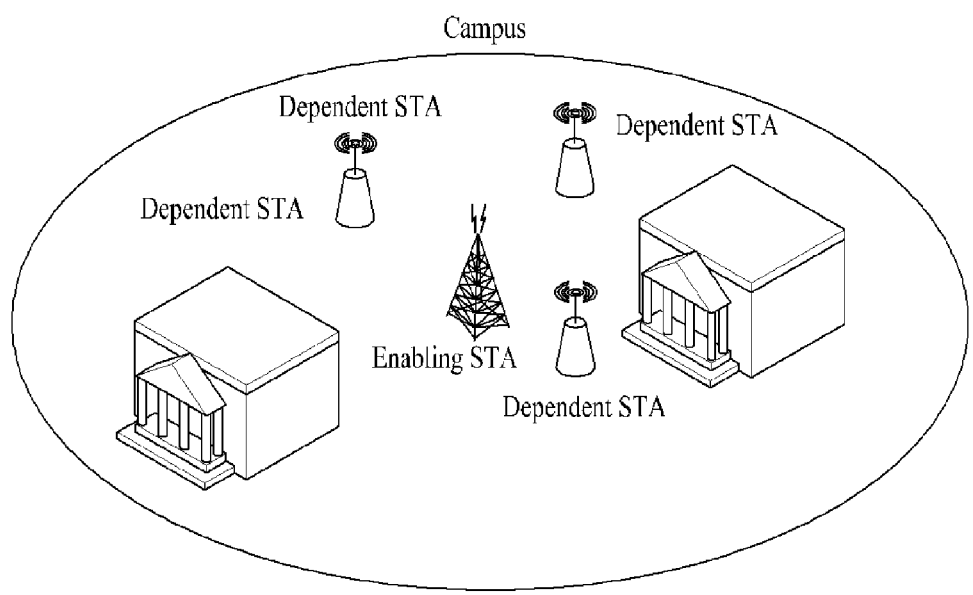
FIG. 6 shows an exemplary WSZ.
FIG. 7 shows the format of a WSM element according to first embodiment of the present invention.

An exemplary WSZ is explained referring to FIG. 6. FIG. 6 shows an exemplary WSZ.

In FIG. 6, it is assumed that there is a plurality of dependent STAs enabled by an enabling STA in a specific area. The plurality of dependent STAs is enabled by receiving an enabling signal from the enabling STA.

In FIG. 6, there are an enabling STA and a plurality of dependent STAs enabled by the enabling STA in a campus, and a plurality of dependent STAs can move in a campus. It is useful to use common available channels in a specific area in service environment such as a campus, office and apartment. And it is also useful in a rural area since a list of available channels seldom varies among locations in a rural area. However, WSZ is not restricted to a rural area or a campus. WSZ can be applied to every area.

The enabling STA can determine a WSZ first, and then select multiple locations covered by the WSZ. Or, the enabling STA can determine a WSZ using predetermined multiple locations. For example, the enabling STA can determine a WSZ using locations of dependent STAs served by the enabling STA.

The enabling STA transmits, to a dependent STA, one of a beacon frame, a probe response frame and a white space map announcement frame comprising a white space map (WSM) element, wherein the WSM element includes information of WSZ and a list of available channels at the WSZ [S530].

FIG. 7 shows the format of a WSM element according to first embodiment of the present invention.

As shown in FIG. 7, a WSM element includes Element ID field, a Length field, a Country code field and a Channel Map field.

The Element ID field may indicate that this element is White Space Map element.

The Length field has a variable value in a unit of octet corresponding to the length of WSM. Since the numbers of available channels and corresponding maximum power level values are variable, the length field may indicate the length of WSM element.

The country code field indicates a location at which the WSM can be used. TV band, bandwidth of TV channel and regulatory domain vary among countries. The country code can be 3 octets country string. First 2 octets indicate country code defined in ISO/IEC 3166-1, and last 1 octet indicates environment. The country code field can indicates detailed location more than country. That is, the country code field can includes a region code in a country.

The Channel Map field indicates the list of available channels.

Available channels identified by the Channel Map field do not have to have a TV channel granularity. However, they can have the smallest channel granularity provided by database. If the smallest channel granularity of available channels provided by database in TVWS is TV channel granularity, available channels of the Channel Map field have TV channel granularity. TV channel bandwidth is 6 MHz in Korea and USA, and 8 MHZ in some countries.

FIG. 8 shows an exemplary format of the Channel Map field according to an embodiment of the present invention.

As shown in FIG. 8, the Channel Map field can includes a Device Type field, a Channel Number field, a Maximum Transmission Power Level field, a Registered Location field and a White Space Zone Range.

The Channel Number field indicates the list of available channels. The Maximum Transmission Power Level field indicates maximum allowed transmission power of the available channels.

When the unlicensed device operates on a specific channel which is available in TVWS and the neighboring channel next to the specific channel is used by an incumbent user, the unlicensed device should lower its transmission power to protect the incumbent user. Therefore, WSM element comprises available channel list and maximum allowed transmission power of the available channels.

The Channel Number field and Maximum Transmission Power Level field pairs can be repeated.

The Device Type field indicates which type of device the list of available channels in WSM element is for. For example, the Device Type field indicates whether the list of available channels in WSM element is for a fixed device or a portable device.

Available channels and maximum allowed transmission power of the available channels can vary among device types. A fixed device cannot use a channel adjacent to a TV channel used by an incumbent user, while a portable device can use a channel adjacent to a TV channel used by an incumbent user on condition that it reduces maximum allowed transmission power form 100 mW to 40 mW. Therefore, the WSM element shall include the Device Type field indicating which type of device the available channels in WSM element are for.

The Device Type field indicates not the device type of a STA transmitting the WSM element but the device type of a STA receiving the WSM element and using it.

The fixed device cannot use WSM including the Device Type field set to a value of portable device, since available channels in the WSM including the Device Type field set to a value of portable device may not be available for s fixed device.

Device type can be defined according to spectrum mask class. A spectrum mask is a mathematically-defined set of lines applied to the levels of radio (or optical) transmissions. The spectrum mask is generally intended to reduce adjacent-channel interference by limiting excessive radiation at frequencies beyond the necessary bandwidth. Attenuation of these spurious emissions is usually done with a band-pass filter, tuned to allow through the correct center frequency of the carrier wave, as well as all necessary sidebands.

A device using a specific spectrum mask class must satisfy a reduction value of power spectral density according to offset frequencies of the specific spectrum mask class. So, available channels and maximum allowed transmission power vary according to a spectrum mask class of a STA.

The Registered Location field indicates information of location of a specific point in WSZ. The Registered Location field can be set to geo-location information expressed as 3 dimensional coordinate (latitude, longitude, altitude). The Registered Location field can include a value and a resolution of each of latitude, longitude and altitude. And it can also include information indicating whether it indicates a location of an enabling STA or a dependent STA. In first embodiment of the present invention, the Registered Location field indicates location of an enabling STA.

FIG. 9 shows exemplary format of the Registered Location field. In FIG. 9, a Dependent Enablement Identifier field, a Regulatory Class field, a Channel Number field can be set as reserved.

The White Space Zone Range field indicates range of WSZ. Range of WSZ can be expressed as various formats such as radius or location vector. The White Space Zone Range field should set so that physical location of WSZ can be calculated with values of the Registered Location field and the White Space Zone Range field.

For example, the Registered Location field is set to 3 dimensional coordinate of (x1, y1, z1) and the White Space Zone Range field is set to radius. Then, WSZ is a ball shape whose center is (x1, y1, z1) and radius is a value of White Space Zone Range field.

That is, the Registered Location field and the White Space Zone Range field together specify WSZ.

Figure 10:
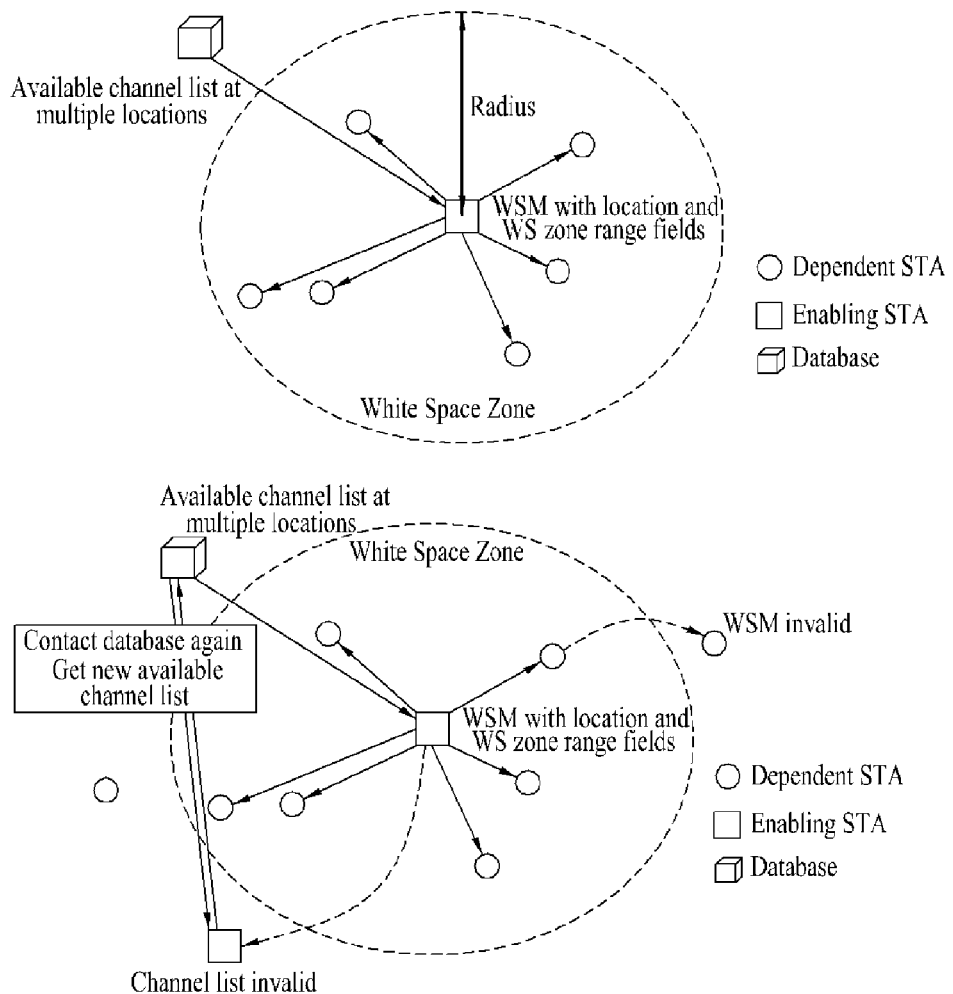
FIG. 10 shows an exemplary WSZ.

FIG. 10 shows an exemplary WSZ.

As shown in FIG. 10, an enabling STA acquires available channel list at multiple locations and determines WSZ. And it transmits, to dependent STA, WSM element with the registered location field, white space zone range field and a list of available channels at WSZ.

The dependent STA, which received WSM element, calculated WSZ with values of the registered location field and the white space zone range field.

The dependent STA can operate on available channels at WSZ while moving in WSZ. When the dependent STA moved out of WSZ, it should update a list of available channels since the list of available channels at WSZ is not valid any longer for the dependent STA.

If the dependent STA, which moved out of WSZ, can communicate the enabling STA and continue enabled state, it can request a new list of available channels to the enabling STA to update a list of available channels. If the enabling STA serves only WSZ, the dependent STA, which moved out of WSZ, is deenabled and should be enabled by another enabling STA.

Next, a method of transmitting WSM information according to second embodiment of the present invention is explained referring to draws.

Figure 11:
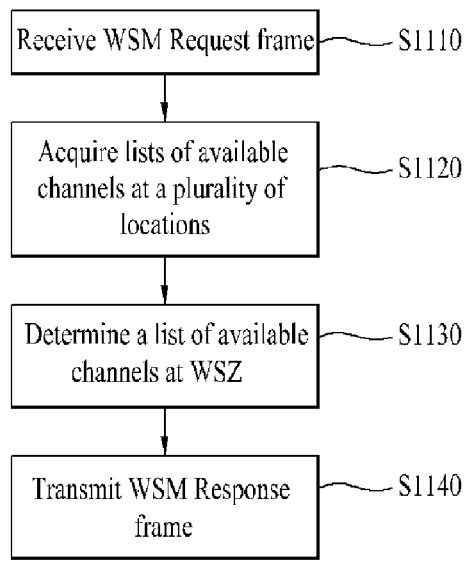
FIG. 11 shows a flow chart of second embodiment for a method of transmitting WSM information according to first embodiment of the present invention.

FIG. 11 shows a flow chart of second embodiment for a method of transmitting WSM information according to first embodiment of the present invention.

As shown in FIG. 11, an enabling STA receives a WSM Request frame from a dependent STA [S1110].

Figure 12:
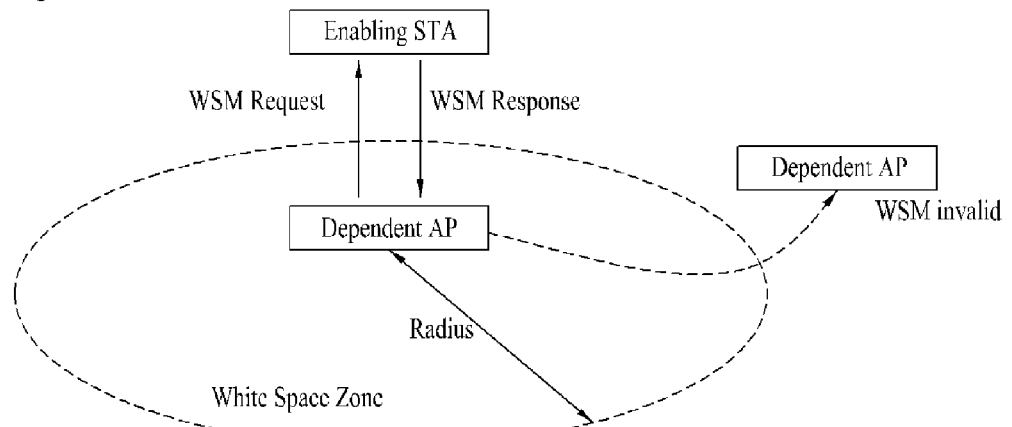
FIG. 12 shows WSZ set by the dependent STA.

A dependent STA can set a WSZ and request available channels in WSZ to an enabling station. FIG. 12 shows WSZ set by the dependent STA.

When a dependent STA want to set a WSZ and use same available channels while moving within the WSZ, it transmits a WSM Request frame to an enabling STA.

Table 1 shows a format of a WSM Request frame.

TABLE 1

| order | Information |
|---|---|
| 1 | Category |
| 2 | Action |
| 3 | Dialog Token |
| 4 | Registered Location |
| 5 | White Space Zone Range |

As shown in table 1, a WSM Request frame includes Registered Location and White

Space Zone Range. Registered Location and White Space Zone Range together specify a WSZ which is set by the dependent STA. For example, Registered Location can be set to geo-location of the dependent STA and White Space Zone Range can be set to radius of the WSZ set by the dependent STA.

The enabling STA calculates the WSZ using values of Registered Location and White Space Zone Range in the WSM Request frame, and acquires a list of available channels at each location of a plurality of locations in the WSZ from a regulatory database [S1120].

The enabling STA can select the plurality of locations in the WSZ based on geolocation of the dependent STA.

The enabling STA determines a list of available channels at the WSZ using the list of available channels at each location of the plurality of locations [S1130].

A scheme of determine a list of available channels at the WSZ can be various. For example, common channels of available channels at each location of the plurality of locations can be available channels at the WSZ.

The enabling STA transmits, to the dependent STA, a WSM Response frame comprising a white space map (WSM), wherein the WSM element includes information of WSZ and a list of available channels at the WSZ [S1140].

Table 2 shows a format of a WSM Response frame.

TABLE 2

| order | Information |
|---|---|
| 1 | Category |
| 2 | Action |
| 3 | Dialog Token |
| 4 | White Space Map |

As shown in Table 2, the WSM Response frame includes WSM. WSM can be WSM element illustrated in FIGS. 7 and 8. That is, the WSM Response frame includes a Registered Location field, a White Space Zone Range field and a Channel Number field.

Registered Location field can be set to geo-location of the dependent STA.

The dependent STA can operate on available channels at WSZ while moving in WSZ. When the dependent STA moved out of WSZ, it should update a list of available channels since the list of available channels at WSZ is not valid any longer for the dependent STA.

Figure 13:
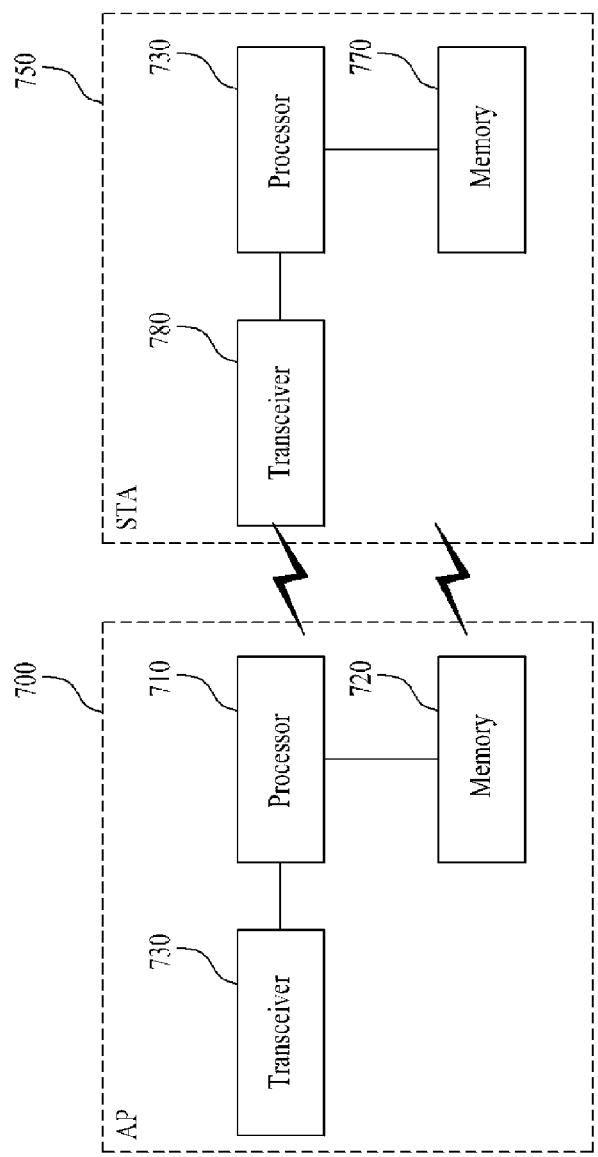
FIG. 13 is a schematic block diagram of wireless apparatuses implementing an exemplary embodiment of the present invention.

FIG. 13 is a schematic block diagram of wireless apparatuses implementing an exemplary embodiment of the present invention.

An AP 700 can include a processor 710, a memory 720, a transceiver 730, and a STA 750 may include a processor 760, a memory 770, and a transceiver 780. The transceivers 730 and 780 transmit/receive a radio signal and implement an IEEE 802 physical layer. The processors 710 and 760 are connected with the transceivers 730 and 760 to implement an IEEE 802 physical layer and/or MAC layer. The processors 710 and 760 may implement the above-described channel scanning method.

The processors 710 and 760 and/or the transceivers 730 and 780 may include an application-specific integrated circuit (ASIC), a different chip set, a logical circuit, and/or a data processing unit. The memories 720 and 770 may include a read-only memory (ROM), a random access memory (RAM), a flash memory, a memory card, a storage medium, and/or any other storage units. When an exemplary embodiment is implemented by software, the above-described scheme may be implemented as a module (process, function, etc.) performing the above-described functions. The module may be stored in the memories 720 and 770 and executed by the processors 710 and 760. The memories 720 and 770 may be disposed within or outside the processors 710 and 760 and connected with the processors 710 and 760 via well-known means.

Among these elements of apparatuses for AP/STA, the structure of processor 710 or 760 will be more specifically explained.

Figure 14:
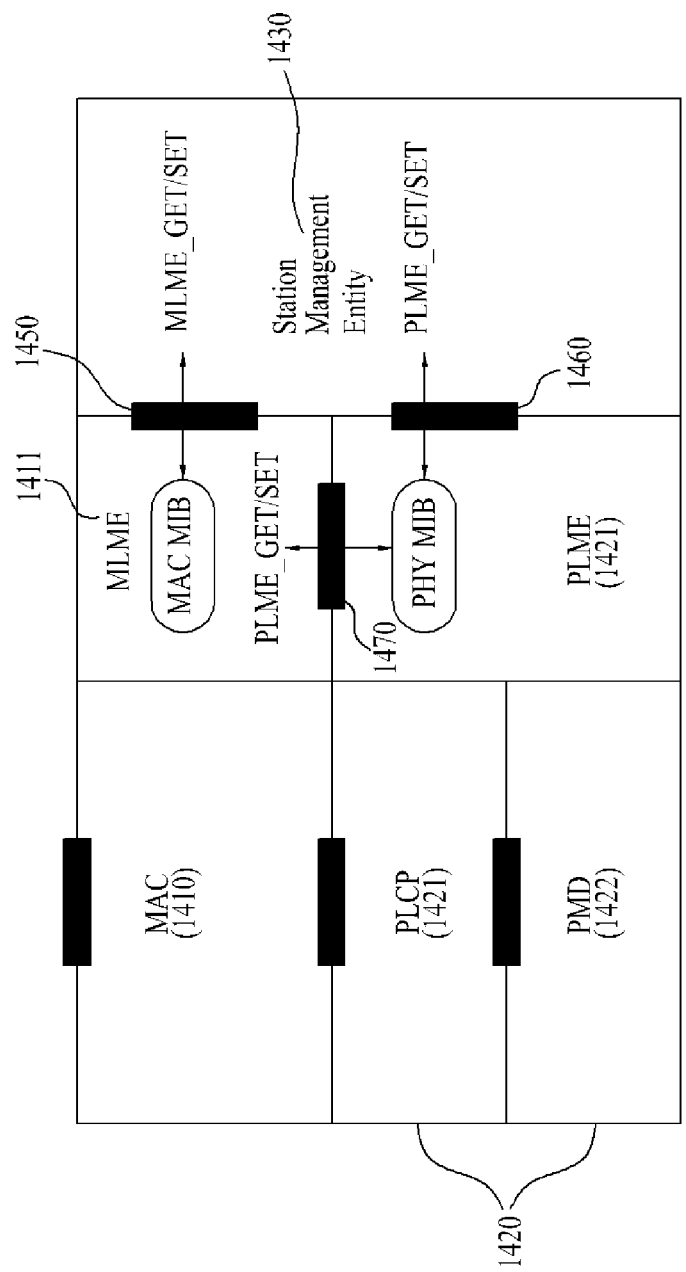
FIG. 14 shows an exemplary structure of processor of STA apparatus according to one embodiment of the present invention.

FIG. 14 shows an exemplary structure of processor of STA apparatus according to one embodiment of the present invention.

Processor 710 or 760 of STA may have multiple layer structures, and FIG. 14 especially focuses on MAC sublayer (1410) on data link layer (DLL) and Physical layer (1420) among these layers. As shown in FIG. 14, PHY (1420) may include PLCP entity (physical layer convergence procedure entity; 1421) and PMD entity (physical medium dependent entity; 1422). Both the MAC sublayer (1410) and PHY (1420) conceptually include management entities, called MLME (MAC sublayer Management Entity; 1411) and PLME (physical layer management entity; 1421), respectively. These entities (1411, 1421) provide the layer management service interfaces through which layer management functions can be invoked.

In order to provide correct MAC operation, an SME (Station Management Entity; 1430) is present within each STA. The SME (1430) is a layer independent entity that can be viewed as residing in a separate management plane or as residing "off to the side." The exact functions of the SME (1430) are not specified in this document, but in general this entity (1430) can be viewed as being responsible for such functions as the gathering of layer-dependent status from the various layer management entities (LMEs), and similarly setting the value of layer-specific parameters. SME (1430) would typically perform such functions on behalf of general system management entities and would implement standard management protocols.

The various entities within FIG. 14 interact in various ways. FIG. 14 shows some examples of exchanging GET/SET primitives. XX-GET.request primitive is used for requesting the value of the given MlBattribute (management information base attribute). XX-GET.confirm primitive is used for returning the appropriate MIB attribute value if status="success," otherwise returning an error indication in the Status field. XX-SET.request primitive is used for requesting that the indicated MIB attribute be set to the given value. If this MIB attribute implies a specific action, then this requests that the action be performed. And, XX-SET.confirm primitive is used such that, if status="success," this confirms that the indicated MIB attribute was set to the requested value, otherwise it returns an error condition in status field. If this MIB attribute implies a specific action, then this confirms that the action was performed.

As shown in FIG. 14, MLME (1411) and SME (1430) may exchange various MLME_GET/SET primitives via MLME_SAP (1450). According to one example of the present invention, SME (1430) may transmit MLME_WSM.request primitive to MLME (1411) for requesting MLME (1411) to transmit the White Space Map Announcement Frame to another STA. In other case, MLME (1411) may transmit MLME-WSM. indication primitive to SME (1430) to indicate the reception of the White Space Map Announcement Frame from another STA.

Also, as shown in FIG. 14, various PLCM_GET/SET primitives may be exchanged between PLME (1421) and SME (1430) via PLME_SAP (1460), and between MLME (1411) and PLME (1470) via MLME-PLME_SAP (1470).

WSM element of one example of the present invention can be transmitted by the sequential procedures of MAC (1410) and PHY (1420). Also, WSM element of one example of the present invention can be received by the sequential procedures of PHY (1420) and MAC (1410).

Although the embodiments of the present invention have been disclosed in view of each aspect of the invention, those skilled in the art will appreciate that embodiments of each aspect of the invention can be incorporated. And, there can be advantages not explicitly discussed, since they are obvious from the description for those skilled in the art.

The invention claimed is:

1. A method for a station (STA) to perform a channel availability query procedure in a wireless communication system, the method comprising:
   transmitting, at a first STA corresponding to a channel availability query requesting STA, a first message to a second STA supporting the channel availability query process, wherein the second STA corresponds to a channel availability query responding STA, wherein the first message comprises device location information of one or more locations for the channel availability query; and
   receiving, at the first STA from the second STA, a second message comprising channel availability information, wherein when the device location information of the first message is for multiple locations within an area, the channel availability information is commonly applicable to the multiple locations within the area.

2. The method of claim 1, wherein the device location information includes a registered location field indicating the one or more locations, and a range field indicating a range of the one or more locations.

3. The method of claim 1, wherein the device location information comprises location information expressed as a three-dimensional coordinate.

4. The method of claim 1, wherein the second station is an enabling station having an authority to control an operation of a dependent station.

5. The method of claim 1, wherein the first station is a dependent station operating under a control of an enabling station.

6. An apparatus operating as a first station (STA) performing a channel query procedure in a wireless communication system, the apparatus comprising:
   a transceiver configured to transmit, at the first STA corresponding to a channel availability query requesting STA, a first message to a second STA supporting the channel availability query process, wherein the second STA corresponds to a channel availability query responding STA, wherein the first message comprises device location information of one or more locations for the channel availability query; and to receive, from the second STA, a second message comprising channel availability information, wherein when the device location information of the first message is for multiple locations within an area, the channel availability information is commonly applicable to the multiple locations within the area; and
   a processor configured to control the transceiver.

7. The apparatus of claim 6, wherein the device location information includes a registered location field indicating the one or more locations, and a range field indicating a range of the one or more locations.

8. The apparatus of claim 6, wherein the device location information comprises location information expressed as a three-dimensional coordinate.

9. A method for a station (STA) to perform a channel availability query procedure in a wireless communication system, the method comprising:
   receiving, from a first STA corresponding to a channel availability query requesting STA, a first message at a second STA supporting the channel availability query process, wherein the second STA corresponds to a channel availability query responding STA, wherein the first message comprises device location information of one or more locations for the channel availability query; and
   transmitting, to the first STA from the second STA, a second message comprising channel availability information, wherein when the device location information of the first message is for multiple locations within an area, the channel availability information is commonly applicable to the multiple locations within the area.

10. An apparatus operating as a second station (STA) performing a channel availability query procedure in a wireless communication system, the apparatus comprising:
    a transceiver configured to receive, from a first STA corresponding to a channel availability query requesting STA, a first message at the second STA supporting the channel availability query process, wherein the second STA corresponds to a channel availability query responding STA, wherein the first message comprises device location information of one or more locations for the channel availability query; and to transmit, to the first STA from the second STA, a second message comprising channel availability information, wherein when the device location information of the first message is for multiple locations within an area, the channel availability information is commonly applicable to the multiple locations within the area; and
    a processor configured to control the transceiver.

* * * * *